US006208910B1

(12) United States Patent
Michael et al.

(10) Patent No.: US 6,208,910 B1
(45) Date of Patent: Mar. 27, 2001

(54) SYSTEM AND METHOD FOR DETERMINING THE LOCATION OF A MAIL PIECE

(75) Inventors: Critelli Michael, Darien; Daniel F. Dlugos, Huntington; Ronald P. Sansone, Weston, all of CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 09/298,785

(22) Filed: Apr. 23, 1999

(51) Int. Cl.[7] .......... G06F 7/00
(52) U.S. Cl. .......... 700/225; 700/215; 700/229
(58) Field of Search .......... 700/225, 226, 700/229, 213, 215, 227

(56) References Cited

U.S. PATENT DOCUMENTS

| | | | | |
|---|---|---|---|---|
| 5,038,283 | * | 8/1991 | Caveney | 364/403 |
| 5,216,620 | * | 6/1993 | Sansone | 364/478 |
| 5,291,002 | * | 3/1994 | Agnew et al. | 235/375 |
| 5,419,440 | * | 5/1995 | Picoult | 209/583 |
| 5,429,249 | * | 7/1995 | Belec et al. | 209/584 |
| 5,638,283 | | 6/1997 | Herbert | 364/464.2 |
| 5,712,789 | * | 1/1998 | Radican | 364/478.14 |
| 5,768,140 | * | 6/1998 | Swartz et al. | 364/478.13 |
| 5,828,322 | * | 10/1998 | Eberhard | 340/988 |
| 5,850,187 | * | 12/1998 | Carrender et al. | 340/825.54 |
| 5,917,925 | * | 6/1999 | Moore | 382/101 |
| 5,959,568 | * | 9/1999 | Woolley | 342/42 |
| 5,971,587 | * | 10/1999 | Kato et al. | 364/468.22 |
| 6,081,827 | * | 6/2000 | Reber et al. | 709/200 |
| 6,087,952 | * | 7/2000 | Prabhakaran | 340/693.5 |
| 6,088,586 | * | 7/2000 | Haverty | 455/422 |

* cited by examiner

*Primary Examiner*—Joseph E. Valenza
*Assistant Examiner*—Khoi H. Tran
(74) *Attorney, Agent, or Firm*—Ronald Reichman; Michael E. Melton

(57) ABSTRACT

A system and method for determining the location of a mail piece using a code identifier of the mail piece that is read as the mail piece is placed within a mail tray. Determination of the location of the mail tray is thus determination of the location of each mail piece therein. Code identifiers on mail trays are read as mail trays are placed in vehicles. Determination of the location of the vehicle is thus determination of the location of each mail tray placed therein and coded mail pieces within the tray. A database is maintained with this hierarchical location information so as to provide a readily available means for determining the location of any mail piece.

20 Claims, 3 Drawing Sheets

SYSTEM AND METHOD FOR DETERMINING THE LOCATION OF A MAIL PIECE

FIELD OF THE INVENTION

The present invention relates to systems and methods for determining the location of an object and in particular, the location of a mail piece as it travels from the sender to the recipient.

BACKGROUND OF THE INVENTION

There are many systems and methods for tracking objects as those objects travel from one location to another. In many of these prior art systems, a mechanism is provided for determining the location of an object as it traverses from its source to its destination. Some of these techniques include the use of radio paging, laser communications, VOR navigation signaling, as well as global positioning system (GPS) navigation systems.

The present invention is directed to a system and method for locating objects, wherein the system and method is specifically directed for use in tracking mail pieces as those mail pieces move from sender to recipient.

SUMMARY OF THE INVENTION

A method and system for determining the location of a mail piece is based upon placement of a code identifier on the mail piece and uses a hierarchical methodology for determining the location of the mail piece as that mail piece travels from the sender to the recipient. In particular, the present invention includes means for reading a code identifier on the mail piece as the mail piece is placed within a mail tray such that information for all such identified mail pieces within the mail tray are known and are communicated to a central database. The mail tray may incorporate a location determining device such as a global positioning satellite (GPS) receiver which can determine the location of the mail tray as it moves from the originating post office to the destination post office or beyond. In typical mail delivery, the mail tray is the container in which all mail pieces destined to a particular destination post office are placed as those mail pieces are sorted at the originating post office or at a mailer site.

In view of the fact that the mail trays may be placed in various types of vehicles including trucks, trains, airplanes and the like, many of which prevent the use of a GPS receiver due to line of site limitations with the receiver, the present invention also provides the capability of identifying all mail trays within such vehicles by placing a code identifier on the mail trays and means for reading the mail trays as they are placed within the vehicle. In such situations, the vehicle would include a GPS receiver, as well as means for communicating to the central database those mail trays placed therein.

Alternatively or in addition thereto, the mail tray may include communication circuitry for responding to queries concerning the location of the mail tray and for returning information concerning its location. In operation, a mail piece after postal cancellation at the facer/canceller is presented to a sorter, wherein all mail pieces destined for a particular post office are placed in the same tray. Thus mail trays provide the container in which the mail pieces travel from the originating post office to the destination post office. In some situations, the mail piece may be presorted by the sender in which case the mail pieces are placed in the mail tray by the sender and then presented to the originating post office.

In either situation, the mail pieces once in the mail tray at the originating post office can have their locations determined by interrogating the mail tray. Tracking is thereby maintained as the mail piece travels in association with the mail tray without placing any restrictions on the mail piece other than use of a code identifier. Communications with the mail tray may be maintained via radio, cellular phone, telephones, computer satellite link or other methods.

The database in which the information concerning the location of the mail tray is presented, either directly by the mail tray or via the vehicle in which the mail tray is placed, is able to monitor information regarding the location of the mail piece throughout its delivery process.

Thus a simple and efficient mechanism is presented for maintaining information concerning mail pieces as they travel throughout the postal system.

BRIEF DESCRIPTION OF THE DRAWINGS

For a fuller understanding and the nature and the objects of the present invention, reference is made to the following description taken in conjunction with the accompanying drawings in which.

DETAILED DESCRIPTION

Figure 1:
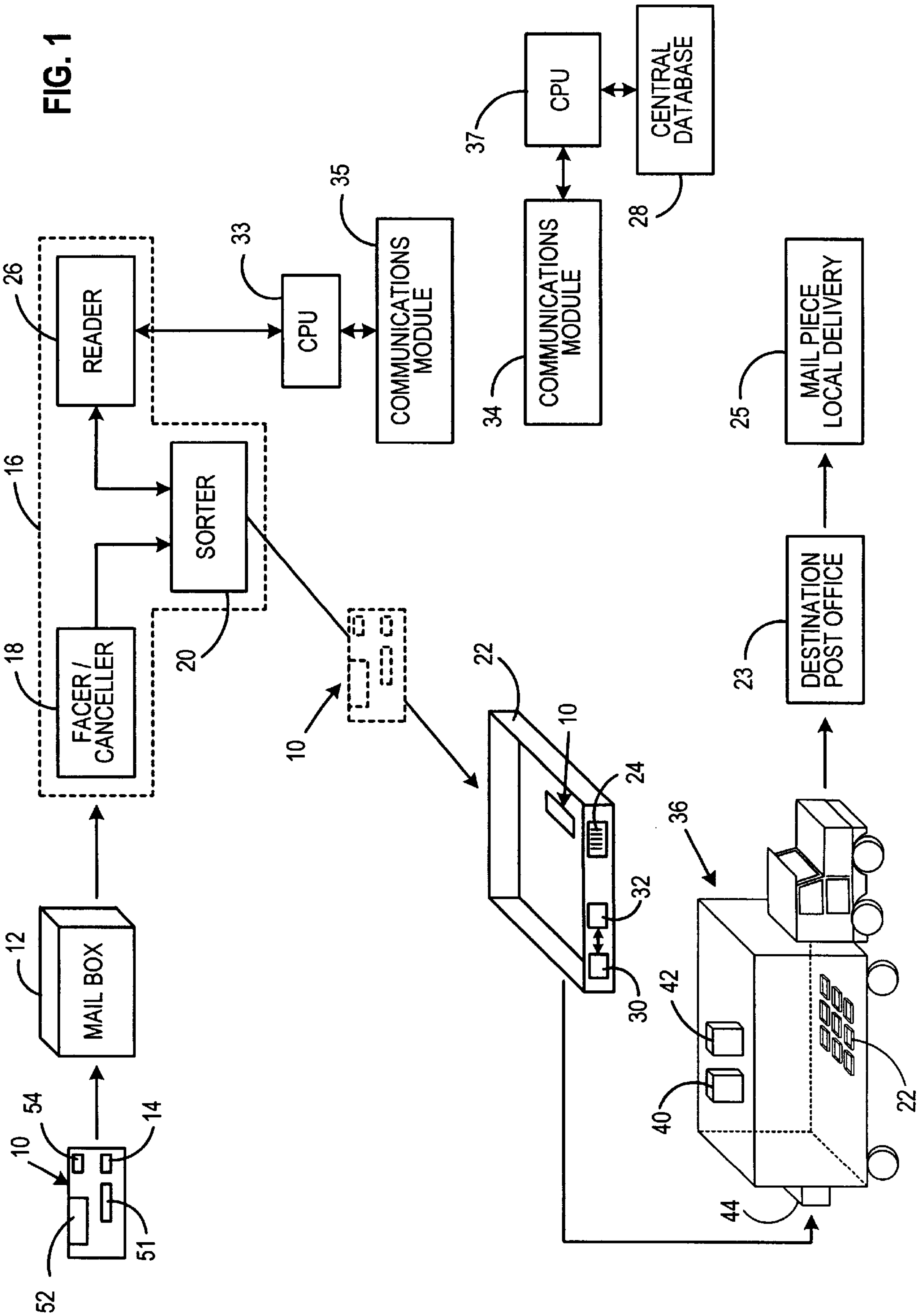
FIG. 1 is a diagrammatic representation of the movement of a mail piece from the sender to the recipient.

As best seen in FIG. 1, a mail piece 10 is typically deposited into a mail box 12 addressed to the recipient. The mail piece in the present invention contains a code identifier 14 such as a bar code shown diagrammatically in FIG. 2. Code identifier 14 may alternatively be produced by an active device like a radio frequency label or an infrared smart card label. Code identifier 14 may also be produced by a passive device, such as a printed bar code or any optical character recognition symbology or an inductive code device similar to those found in identification badges.

In typical postal operations, mail piece 10 is presented to an originating post office 16 which contains various equipment including a facer/canceller 18, a sorter 20 and a reader 26. The facer/canceller faces the mail piece 10 and cancels the postage on mail pieces having stamps, while sorter 20 determines the destination post office of the mail piece. The sorter typically outputs the mail piece into a mail tray 22 out of a plurality of mail trays as shown diagrammatically in FIG. 1. The particular mail tray is associated with a particular destination post office 23. The mail piece is then locally delivered 25 to the addressed recipient. The mail tray in turn may include a code identifier 24 as shown diagrammatically in FIG. 1. All mail pieces placed in a mail tray have the same destination post office sorted by zip code and in some cases, may actually have the same mail route at that destination post office.

Associated with mail tray 22, either as part of mail tray 22 or as a separate device, is a reader 26 for reading each mail piece 10 prior to insertion into mail tray 22. The reader communicates directly or indirectly via remote communication module 34 with a central database 28, typically remotely located with respect to the originating post office 16. Thus the database 28 maintains information concerning each mail tray 22 and for each mail tray 22, the mail pieces 10 placed therein. A central processing unit 33 and communication module 35 are used to control the data operations and transfer of information to the database 28. Thus once mail pieces 10 are placed within the mail tray 22, information concerning the location of any such piece within the mail tray can be determined by determining the location of the mail tray.

As shown diagrammatically in FIG. 1, the present invention can use the satellites (not shown) forming the global positioning satellite (GPS) system which by means of a GPS receiver 30 can determine the location of that receiver with respect to its placement on the earth. Such a GPS receiver 30 is shown diagrammatically in FIG. 1 as attached to mail tray 22. In addition, the mail tray may contain a communication module 32 which communicates with the GPS receiver for requesting information concerning the location of the mail tray. The communication module also communicates with a remote communication module 34 so as to receive instructions from the remote communication module for information concerning the location of the mail tray. The remote communication module 34 in turn communicates such information to the central database 28. These operations are under the control of a central processing unit 37.

As also seen in FIG. 1, it is typical that the mail trays are placed in various types of vehicles 36 as mail trays 22 are routed from the originating post office 16 to the destination post office 23. Such vehicles 36 can include trucks, trains, airplanes, boats and the like. More than one vehicle 36 may be used as mail tray 22 moves from originating post office 16 to destination post office 23. Since most GPS receivers do not operate if line of site to a plurality of GPS satellites is not available, it is necessary in order to determine the location of mail tray 22 and hence the mail pieces 10 contained therein, that the mail tray 22 identity be communicated to vehicle 36 and for the vehicle 36 itself to have an associated GPS receiver 40 placed thereon with associated communication equipment. In this configuration, vehicle 36 includes a communication module 42 for receiving communication requests from the remote communication module 34 as well as a reader 44 for reading code identifier 24 on each mail tray 22 placed within vehicle 36. Thus database 28 not only contains information concerning mail pieces 10 within a mail tray 22, but also the identity of mail trays 22 within a given vehicle 36 at any given time. With such information, the location of all mail pieces 10 within all mail trays 22 within vehicle 36 can be determined. This information could be displayed on a terminal 46 in response to a query therefrom.

Database 28 thus maintains hierarchical information that links mail pieces 10 to mail trays 22 and that links mail trays 22 to vehicles 36. Location information of vehicles 36 or mail trays 22 thus is linked to location information regarding mail pieces 10 placed within these mail trays 22.

In this configuration, the typical operation of the system and method is for the remote communication module 34 to communicate with the communication module 42 on vehicle 36 while mail tray 22 is within the vehicle. Because the database has hierarchical information concerning each mail piece within each mail tray 22 and each mail tray 22 within each vehicle 36, it is readily known which vehicle 36 needs to be communicated with in order to determine the location of mail piece 10. The vehicle 36 through the associated GPS receiver 40 can then report back to the remote communication module 34 the specific location of vehicle 36 and hence, any mail piece 10 contained therein.

At times when a mail tray 22 is not within a vehicle 36, the remote communication module 34 can communicate directly with the communication module 32 on mail tray 22 and obtain similar information concerning the location of mail tray 22 via GPS receiver 30 on mail tray 22. This information is communicated back to remote communication module 34 via communication module 32. The updated information is placed in database 28 and thus provides information concerning the location of mail piece 10. Database 28 may maintain a log of all such communications concerning each mail piece 10, thereby providing a location history of mail piece 10 as it travels from originating post office 16 to destination post office 23. Time stamping of this location information as stored in database 28 would of course be part of the data stored in database 28.

Figure 2:
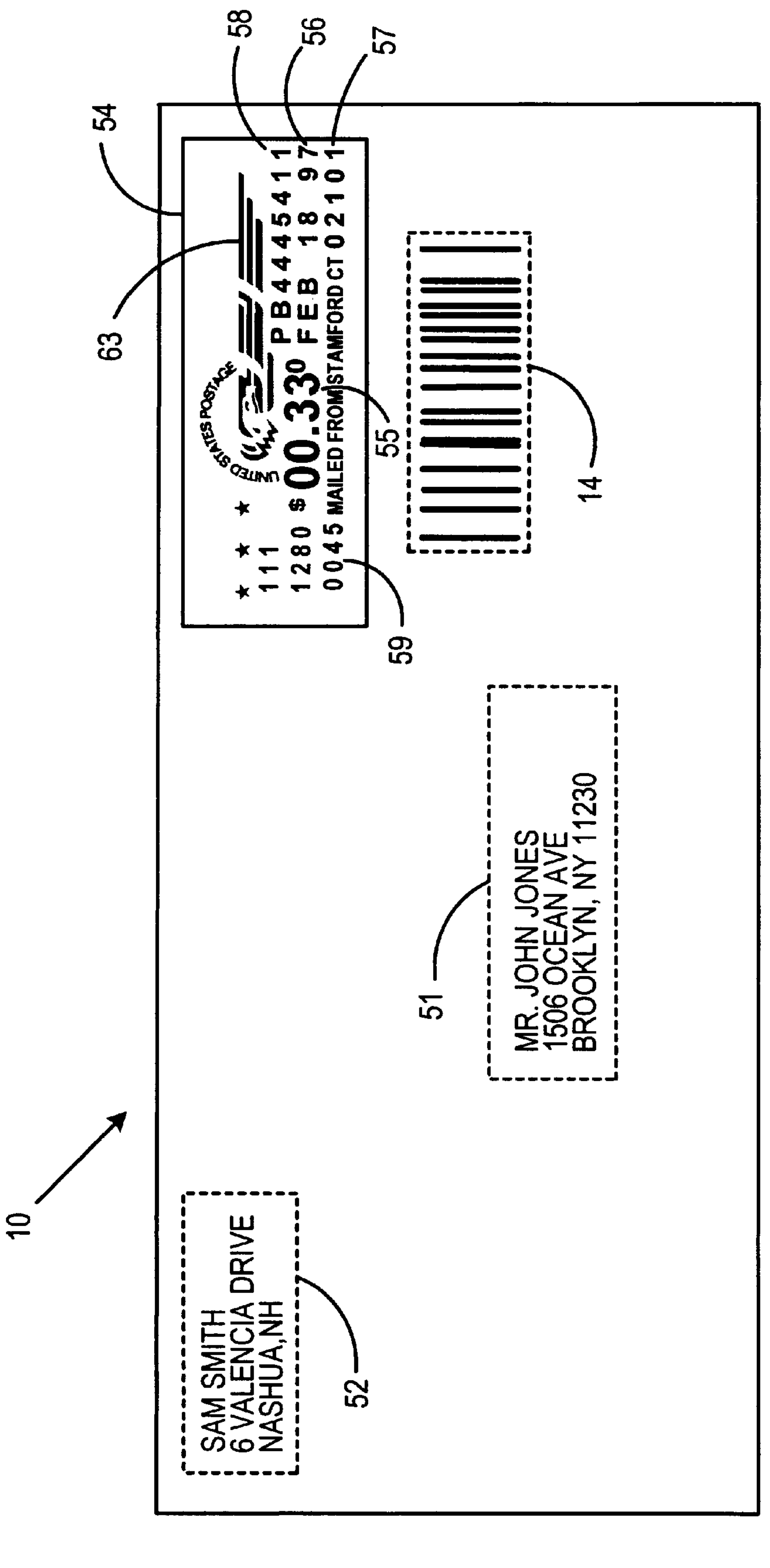
FIG. 2 is a diagrammatic representation of a mail piece with a code identifier placed thereon.

FIG. 2 is a drawing of a mail piece 10 containing code identifier 14. Code identifier 14 may be a passive or active bar code. Mail piece 10 has a recipient address field 51 and a sender address field 52. A postal indicia 54 is affixed to mail piece 10. Indicia 54 contains a dollar amount 55, the date 56 that postal indicia 54 was affixed to mail piece 10, the place 57 that mail piece 10 was mailed, the postal meter serial number 58, an eagle or other graphic representation 63 and a security code 59. It would be obvious to one skilled in the art that code 14 may be moved to other locations on mail piece 10.

Figure 3:
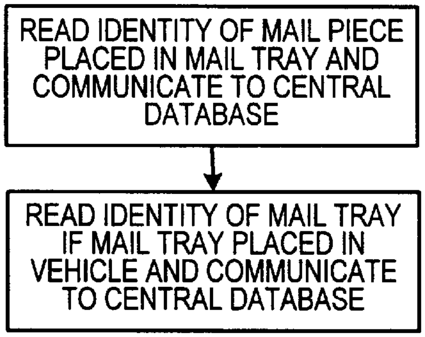
FIG. 3 is a flow chart showing the reading and storing of code identifier information with respect to mail pieces and mail trays according to the present invention.
Figure 4:
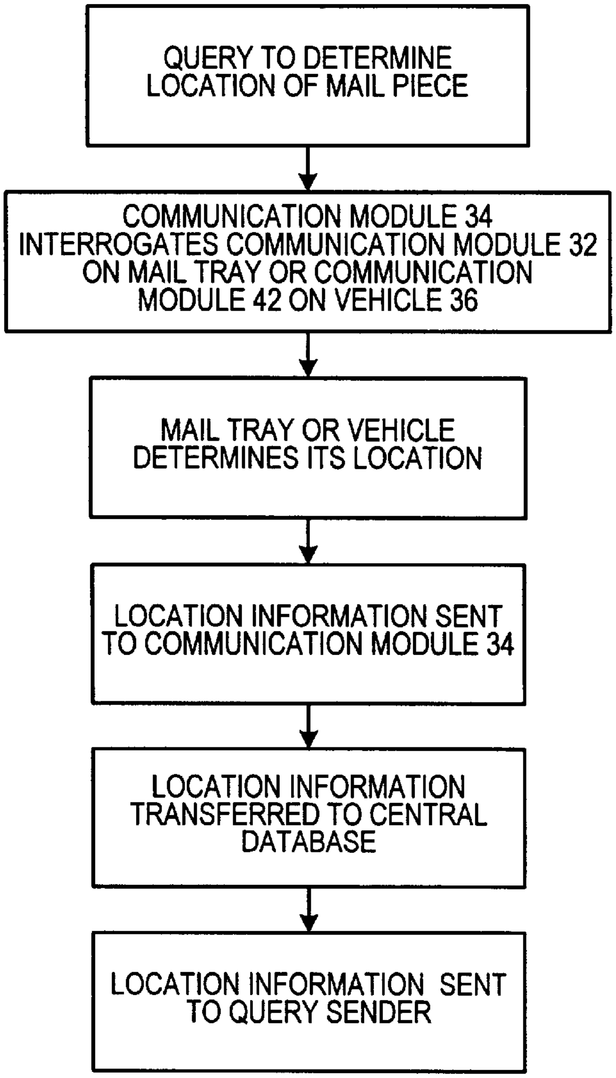
FIG. 4 is a flow chart of the steps for querying the system concerning the location of a mail piece.

FIGS. 3 and 4 are flow charts that illustrate the steps with respect to reading code identifier information or mail pieces and mail trays and for obtaining location information regarding a mail piece.

FIG. 3 is a flow chart that shows reading and storing of code identifier information with respect to mail pieces and mail trays. As shown, the identity of mail piece 10 is read when it is placed in mail tray 22. This information is then communicated to central database 28. In addition, the identity of mail tray 22 is read if the mail tray 22 is placed in a vehicle 36. This information is also communicated to central database 28.

FIG. 4 is a flow chart of the query steps for determining the location of mail piece 10. As seen, remote communication module 34 interrogates communication module 32 on mail tray 22 or remote communication module 34 interrogates communication module 42 on vehicle 36. In this way the location of mail tray 22 or vehicle 36 is determined and sent to remote communication module 34. This location information is then transferred to central database 28. The location information is also sent to the sender of the location query. Although the mail trays are shown with a GPS receiver and a communication module, the system could operate without same if information of the mail trays within vehicles is maintained and if such vehicles have the above-described location determining and communicating modules.

Alternatively, instead of the remote communication module interrogating the communication module 42 on the vehicle or the mail tray, the vehicle or the mail tray could periodically transmit information concerning its location to the remote communication module for automatic updating of the database 28 such that the database would have timely information within some interval of time for every mail piece tracked by the system.

Thus what has been described is an overall system and method for determining the location of a mail piece as that mail piece travels from an originating post office to a destination post office. If the mail tray is maintained for a mail delivery route, information beyond the destination post office can be maintained by the overall system.

In the foregoing specification, the invention has been described as referenced to specific embodiments thereof. It will, however, be evident that various modification and changes may be made thereto without departing from the broader spirit and scope of the invention. The specification and drawings are, accordingly, to be regarded as illustrative rather than in a restrictive sense.

What is claimed is:

1. A method of determining the location of a mail piece, comprising the steps of:

1) placing a code identifier on the mail piece;

2) reading the code identifier on the mail piece;

3) placing the mail piece in a mail tray that contains a mail tray code identifier;

4) linking the read code identifier to the mail tray in which the mail piece is placed; and 5) determining the location of the mail tray while the mail piece is in the mail tray by a first GPS device;

6) reading the mail tray code identifier when the mail tray is placed in a vehicle;

7) linking the mail tray code identifier to the vehicle in which the mail tray is placed; and 8) determining the location of the vehicle by a second GFS device while the mail tray is in the vehicle.

2. A method of determining the location of a mail piece as defined in claim 1, further comprising the step of transferring the information regarding the mail tray location and the linked mail pieces to a database.

3. A method of determining the location of a mail piece as defined in claim 2, further comprising the step of maintaining a history of the determined locations of the mail tray.

4. A method of determining the location of a mail piece as defined in claim 3 wherein the mail piece code identifier is transferred to the database.

5. A method of determining the location of a mail piece as defined in claim 4, wherein the location of the vehicle is determined and transferred to the database.

6. A method of determining the location of a mail piece as defined in claim 5, wherein the database maintains hierarchical information of each mail piece by links of each mail piece to a mail tray and of each mail tray to a vehicle.

7. A method of determining the location of a mail piece as defined in claim 1, wherein the code identifier is active.

8. A method of determining the location of a mail piece as defined in claim 1, wherein the code identifier is passive.

9. The method claimed in claim 1, wherein a plurality of mail pieces containing code identifiers are placed in the mail tray.

10. The method claimed in claim 1, wherein a plurality of mail trays are placed in the vehicle.

11. A system for determining the location of a mail piece, comprising:

1) means for placing a code identifier on the mail piece;

2) means for reading the code identifier on the mail piece;

3) means for placing the mail piece in a mail tray that contains a mail tray code identifier;

4) means for linking the read code identifier to the mail tray in which the mail piece is placed;

5) means for determining the location of the mail tray while the mail piece is in the mail tray by a first GPS device;

6) means for reading the mail tray code identifier when the mail tray is placed in a vehicle;

7) means for linking the mail tray code identifier to the vehicle in which the mail tray is placed; and 8) means for determining the location of the vehicle while the mail tray is in the vehicle by a second GPS device.

12. A system for determining the location of a mail piece as defined in claim 11, further comprising means for transferring the information regarding the mail tray location and the linked mail pieces to a database.

13. A system for determining the location of a mail piece as defined in claim 12, wherein the database contains a history of the determined locations of the mail tray.

14. A system for determining the location of a mail piece as defined in claim 13 wherein the mail piece code identifier is transferred to the database.

15. A system for determining the location of a mail piece as defined in claim 14, further comprising means for determining the location of the vehicle and means for transferring the determined location information to the database.

16. A system for determining the location of a mail piece as defined in claim 15, wherein the database contains a hierarchical information of each mail piece by links of each mail piece to a mail tray and of each mail tray to a vehicle.

17. A system for determining the location of a mail piece as defined in claim 11, wherein the code identifier is active.

18. A system for determining the location of a mail piece as defined in claim 11, wherein the code identifier is passive.

19. the system in claim 11, wherein a plurality of mail pieces containing code identifiers are placed in the mail tray.

20. The system claimed in claim 11, wherein a plurality of mail trays are placed in the vehicle.

* * * * *

UNITED STATES PATENT AND TRADEMARK OFFICE

CERTIFICATE OF CORRECTION

PATENT NO. : 6,208,910 B1
DATED : March 27, 2001
INVENTOR(S) : Michael Critelli et al.

It is certified that error appears in the above-identified patent and that said Letters Patent is hereby corrected as shown below:

Column 5, claim 1,
Line 16, change "GFS" to -- GPS --.

Signed and Sealed this

Second Day of April, 2002

*Attest:*

JAMES E. ROGAN
*Director of the United States Patent and Trademark Office*

*Attesting Officer*